A. I. Ambler,
Band Pulley,
Nº 46,867. Patented Mar. 21, 1865.
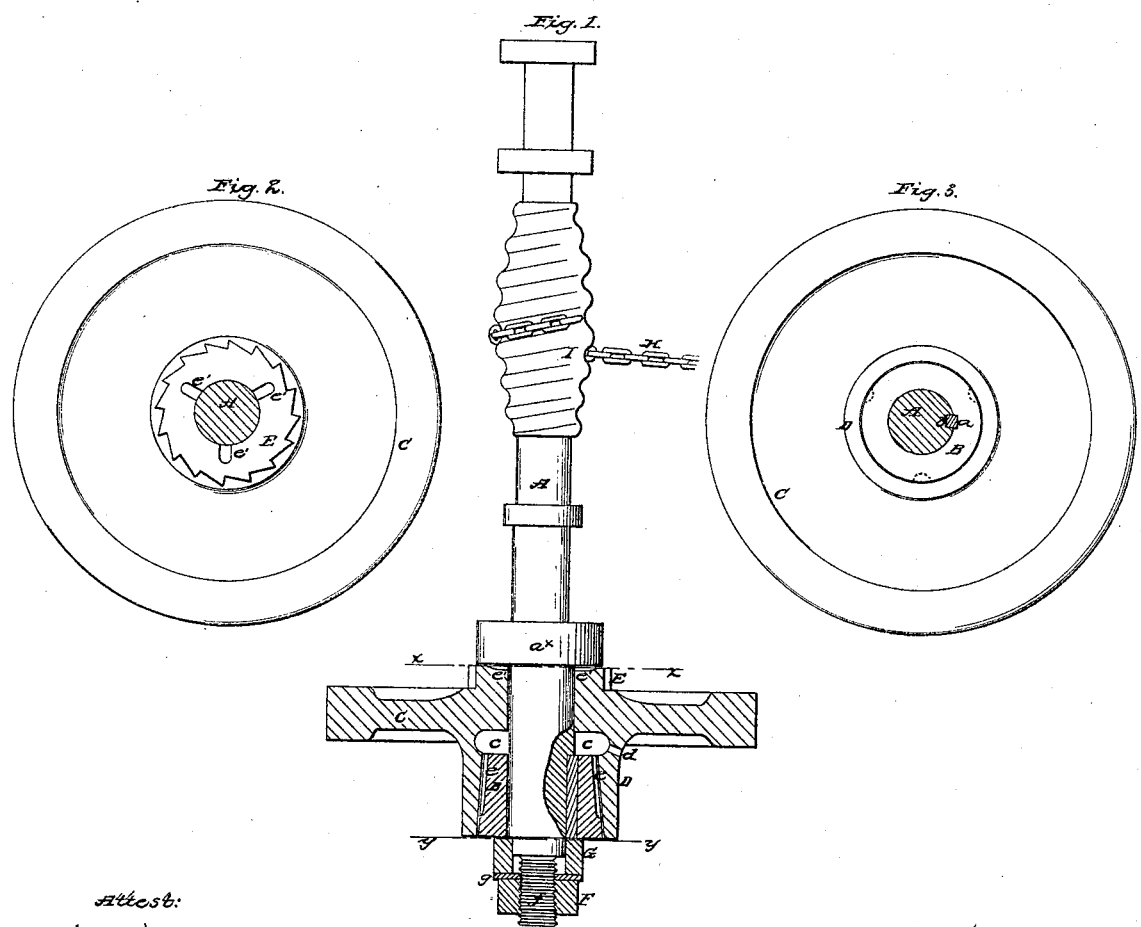

UNITED STATES PATENT OFFICE.

AUGUSTINE I. AMBLER, OF CHICAGO, ILLINOIS.

IMPROVEMENT IN FRICTION-WHEELS AND OIL-CHAMBERS.

Specification forming part of Letters Patent No. 46,867, dated March 21, 1865.

*To all whom it may concern:*

Be it known that I, AUGUSTINE IREL AMBLER, of Chicago, in the county of Cook and State of Illinois, have invented a new and useful combination of a friction-wheel and oil-chamber, designed for applying power to railroad-car brakes and to other machinery; and I do hereby declare that the following is a full, clear, and exact description of the same, reference being had to the accompanying drawings, making a part of this specification, in which—

Figure 1 is a plan or top view of a shaft having my invention applied to it, the latter being in section, the line of section passing through the center; Fig. 2, a view of the inner side of the friction-wheel, the shaft being in section, as indicated by the line $x\ x$, Fig. 1; Fig. 3, a view of the outer side of the same, the shaft being in section, as indicated by the line $y\ y$, Fig. 1.

Similar letters of reference indicate corresponding parts in the several figures.

The following description relates to the invention as applied to railroad-car brakes, but the invention is applicable to other machinery to which power is transmitted through the medium of a friction-wheel.

The invention consists in combining with a friction-wheel an oil-chamber arranged in such a manner that the former will always be kept in a perfect state of lubrication, the importance of which in connection with a friction-wheel for transmitting power will be hereinafter set forth.

To enable those skilled in the art to fully understand and construct my invention, I will proceed to describe it.

A represents a shaft, on which a conical bushing or collar, B, is placed loosely, so as to have a slight end motion on the shaft or a motion longitudinally with the shaft. The bushing or collar is provided with a feather, $d$, which is fitted in a groove, $b$, in the shaft, the feather and groove insuring the rotation of the shaft with the bushing or collar. (See Fig. 3.)

C is a friction-wheel, placed loosely on the shaft A, and provided with a hub, D, the interior of which is of conical form, to receive the bushing or collar B. The hub D is rather longer than the bushing or collar, and the former has a groove, $c$, made in it, said groove extending all around the hub at its inner end and forming an oil-chamber at the inner end of the bushing or collar, as shown clearly in Fig. 1. This oil-chamber is supplied with oil through a hole, $d$, in the hub, said hole being closed by a screw or stopper of any proper kind.

The periphery of the bushing or collar B has a series of longitudinal grooves $c$ made in it, extending from its inner to nearly its outer end. They do not extend fully to the outer end of the bushing or collar, as the oil would then escape. There are also on back of wheel grooves $e'$. These grooves $e$ admit the oil from the chamber $c$ between the bushing or collar B and hub D, and these gooves $e$, although represented as being formed longitudinally in the periphery of the bushing or collar, are not necessarily so formed. They may be arranged spirally, obliquely, or otherwise.

At the inner side of the wheel C, and concentric therewith, there is a ratchet, E, and on the shaft A, at the outer side of the wheel C, there is cut a screw, $f$, to receive a nut, F, an india-rubber volute, or other spring, G, and a washer, $g$, being interposed between the nut F and the bushing or collar B.

From the above description it will be seen that the wheel C may be fitted on the shaft A so as to turn the shaft A under a greater or less resistance of the latter, according to the adjustment of the bushing or collar B in the hub D, the friction between the bushing or collar and the hub being increased by pressing the latter into the former through the medium of the nut, and the friction diminished by unscrewing or loosening the nut. A collar, $a^x$, on shaft A, serves as a stop for wheel C, with grooves for lubrication.

The brakes are operated by a chain, H, attached to shaft A, and the amount of power (maximum) designed to be applied to shaft A, in order to wind up the chain H, is obtained by turning the nut F. When the maximum power is reached the wheel C will turn on the bushing or collar.

The ratchet E has a pawl engaged with it for holding the power or preventing it from giving back when the wheel C is released from the wheel or rail which imparted motion to it. The wheel C is rotated or has power applied to it by being pressed in contact with a wheel or any working shaft of the locomotive or by being brought in contact with the rails. The holding of the power of the shaft A by means of the ratchet and pawl is important, for the brakes might otherwise be prematurely relieved by back-action. This back action (backward movement of the cars) will, when the wheel C is retained by the ratchet and pawl, cause the shaft A to slip back when the friction between the hub D and bushing or collar is overcome, and thus prevent the chain from breaking, a contingency which would occur were the back action allowed to overcome the tensional power of the chain. This is a serious difficulty in the way of all devices for train-brakes when the parts are not supplied with oil for lubrication. By my improvement perfect lubrication is obtained at all times. Thus, when the rotation of the shaft A is stopped, the wheel C works readily and freely on the bushing or collar D. On passengers-cars, when this wheel is used to operate the brakes, the rotation of the shaft A is rapid and of short duration—say two or three revolutions—and the journals of the shaft require no oil for lubrication, the wheel working when the shaft stops.

For the purpose of using a friction-wheel in connection with a train-brake or power hand-brake, it is not only all-important, but essentially necessary that the friction-wheel be perfectly lubricated in some convenient manner, for without lubrication the parts will heat, expand, and grind, thereby preventing the free turning of the parts and causing the breaking of the chains. A certain and uniform maximum is also essential.

By this invention, therefore, the tensional strain on the brake chains is limited to a uniform and given maximum of power applied, the wheel yielding to a greater strain in the back action, so as to relieve the chain and prevent it from breaking. Besides, this wheel enables the mechanic to wind the chain direct upon the shaft without danger of breaking it under the power applied, and is thereby enabled to increase the power by decreasing the surface upon which the chain is wound. This is especially important in the application of the device to passenger cars, so that the size or diameter of the wheel may be decreased.

Upon the shaft A there is a bi-conical spiral grooved head, I, the object of which is to conduct the chain in the proper direction and prevent it from "riding." It is made of largest diameter at the center for the purpose of taking up the slack rapidly when but little power is required, and in the back action, when the same is nearly exhausted, to act as a leverage, and thus cause the brakes to return readily to a uniform minimum.

In applying this invention to passenger or frieght cars, as a means of obtaining power to set the brakes, it is not necessary to use either the ratchet or grooved head.

The wheel C may be grooved at its periphery or be perfectly smooth, according to the surface with which it is to be brought in contact.

Having thus described my invention, what I claim as new, and desire to secure by Letters Patent, is—

1. The wheel C, combined and arranged with the bushing or collar B upon a shaft, A, in such a manner as to form a friction-clutch and an oil-chamber, substantially as set forth.

2. In combination with the male and female parts of the clutch, the feather and groove a b, spring G, nut F, when used with a friction-wheel, C, substantially as and for the purpose specified.

3. The bi-conical spiral grooved head I, placed on the shaft A, in combination with the friction-wheel C, for the purpose specified.

AUGUSTINE IREL AMBLER.

Witnesses:
C. D. WOLF,
H. O. WITT.